United States Patent [19]
Meany et al.

[11] Patent Number: 5,850,482
[45] Date of Patent: Dec. 15, 1998

[54] ERROR RESILIENT METHOD AND APPARATUS FOR ENTROPY CODING

[75] Inventors: James J. Meany, Des Peres; Christopher J. Martens, Creve Coeur, both of Mo.

[73] Assignee: McDonnell Douglas Corporation, St. Louis, Mo.

[21] Appl. No.: 633,896

[22] Filed: Apr. 17, 1996

[51] Int. Cl.[6] ................................................. G06K 9/00
[52] U.S. Cl. .............................................. 382/232; 382/275
[58] Field of Search ................................... 382/232, 233,
382/234, 235, 236, 237, 238, 239, 240,
244, 245, 246, 248, 249, 250, 251, 252,
253, 270, 274, 275, 254, 305, 309, 310,
311, 224, 190, 166, 172, 306; 375/286,
298, 254, 264; 371/37.7, 43.1, 37.08, 37.5;
380/20, 10; 370/314; 348/476, 5.5; 340/825.44

[56] References Cited

U.S. PATENT DOCUMENTS

| | | | |
|---|---|---|---|
| 4,817,182 | 3/1989 | Adelson et al. | 382/56 |
| 5,014,134 | 5/1991 | Lawton et al. | 358/261.3 |
| 5,101,446 | 3/1992 | Resnikoff et al. | 382/56 |
| 5,168,493 | 12/1992 | Nelson et al. | 370/84 |
| 5,289,501 | 2/1994 | Seshadri et al. | 375/17 |
| 5,315,670 | 5/1994 | Shapiro | 382/56 |
| 5,321,750 | 6/1994 | Nadan | 380/20 |
| 5,321,776 | 6/1994 | Shapiro | 382/56 |
| 5,471,486 | 11/1995 | Baggen et al. | 371/37.1 |

OTHER PUBLICATIONS

Edward R. Fiala and Daniel H. Greene, Data Compression with Finite Windows, *Communications of the ACM*, vol. 32, No. 4, Apr. 1989, pp. 490–505.

Timothy C. Bell, John G. Cleary and Ian H. Written, *Text Compression*, Prentice Hall, Copyright 1990, pp. 290–295.

Imran Ali Shah, Olu Akiwumi–Assani and Brian Johnson, A Chip Set for Lossless Image Compression, *IEEE Journal of Solid–State Circuits*, vol. 26, No. 3, Mar. 1991, pp. 237–244.

Gregory K. Wallace, The JPEG Still Picture Compression Standard, *Communication of the ACM*, vol. 34, No. 4, Apr. 1991, pp. 30–45.

Olivier Rioul and Martin Vetterli, Wavelets and Signal Processing, *IEEE SP Magazine*, Oct. 1991, pp. 14–38.

Albert Cohen, Biorthogonal Wavelets, *Wavelets–A Tutorial in Theory and Applications*, Copyright 1992, pp. 123–152.

A. S. Lewis and G. Knowles, Image Compression Using the 2–D Wavelet, *IEEE Transaction on Image Processing*, vol. 1, No. 2, Apr. 1992, pp. 244–250.

(List continued on next page.)

*Primary Examiner*—Leo H. Boundreau
*Assistant Examiner*—Bijan Tadayon
*Attorney, Agent, or Firm*—Bell Seltzer Intellectual Property Group of Alston & Bird, LLP

[57] ABSTRACT

The error resilient method and apparatus for encoding data includes an encoder including a code word generator for generating a plurality of code words representative of respective portions of the data. The code word generator encodes data pursuant to split field coding in which each code word includes a prefix field and an associated suffix field. The prefix field includes information representative of a predetermined characteristic of the associated suffix field, such as the predetermined number of characters which form the associated suffix field. In addition, the suffix fields include information representative of at least some of the original data. Consequently, if the prefix field of a code word is decoded correctly, i.e, without the occurrence of bit error, the error resilient method and apparatus can correctly determine the length of the associated suffix field and the range of coefficient values to be represented by the associated suffix field such that the associated suffix field is resilient to errors. In order to increase the probability that the prefix field will be correctly decoded, the method and apparatus protects the prefix and suffix fields of the encoded data to greater and lesser degrees, respectively, such that the data can be more efficiently compressed.

30 Claims, 6 Drawing Sheets

OTHER PUBLICATIONS

Mladen Victor Wickerhauser, *High–Resolution Still Picture Compression*, Apr. 19, 1992, pp. 1–33. (No Title of Publication).

Marc Antonini, Michel Barlaud, Pierre Mathieu and Ingrid Daubechies, Image Coding Using Wavelet Transform, *IEEE Transactions on Image Processing*, vol. 1, No. 2, Apr. 1992, pp. 205–220.

Naoto Tanabe and Nariman Farvardin, Subband Image Coding Using Entropy–Coded Quantization over Noisy Channels, *IEEE Journal on Selected Areas in Communications*, vol. 10, No. 5, Jun. 1992, pp. 926–943.

Amir Said and William A. Pearlman, Reversible image compression via multiresolution representation and predictive coding, *SPIE*, vol. 2094, 1993, pp. 664–674.

Jerome M. Shapiro, Embedded Image Coding Using Zerotrees of Wavelet Coefficients, *IEEE Transactions on Signal Processing*, vol. 41, No. 12, Dec. 1993, pp. 3445–3462.

Michael L. Hilton, Björn D. Jawerth and Ayan Sengupta, Compressing Still and Moving Images with Wavelets, *Multimedia Systems*, vol. 2, No. 3, Apr. 18, 1994, pp. 1–20.

Keith A. Birney and Thomas R. Fischer, On the Modeling of DCT and Subband Image Data for Compression, *IEEE Transactions on Image Processing*, vol. 4, No. 2, Feb. 1995, pp. 186–193.

Parthasarathy Sriram and Michael W. Marcellin, Image Coding Using Wavelet Transforms and Entropy–Constrained Trellis–Coded Quantization, *IEEE Transactions on Image Processing*, vol. 4, No. 6, Jun. 1995, pp. 725–733.

Björn Jawerth and Wim Sweldens, *An Overview Of Wavelet Based Multiresolution Analyses*, pp. 1–39. (No Title Of Publication), (No Date Of Publication).

Wim Sweldens, *The Lifting Scheme: A New Philosophy in Biorthogonal Wavelet Constructions*. (No Place Or Date Of Publication & No Page #).

Ahmad Zandi, James D. Allen, Edward L. Schwartz and Martin Boliek, *CREW: Compression with Reversible Embedded Wavelets*. (No Place Or Date) & (No Page #).

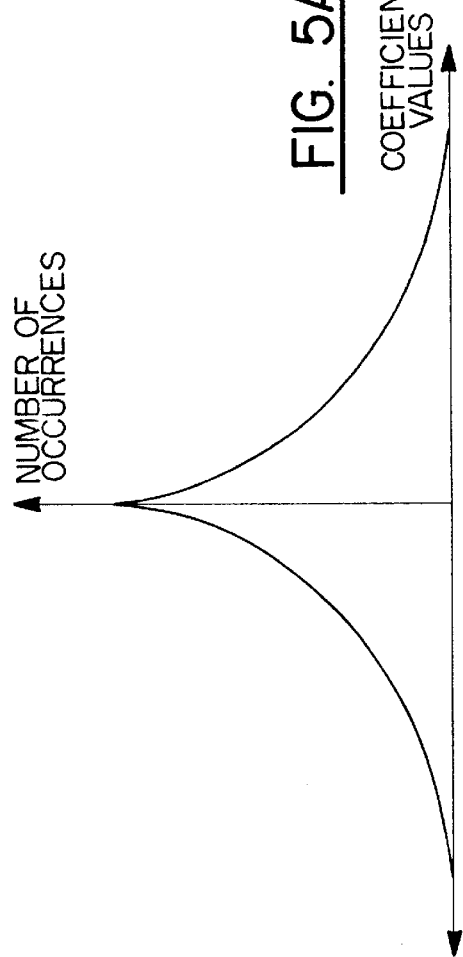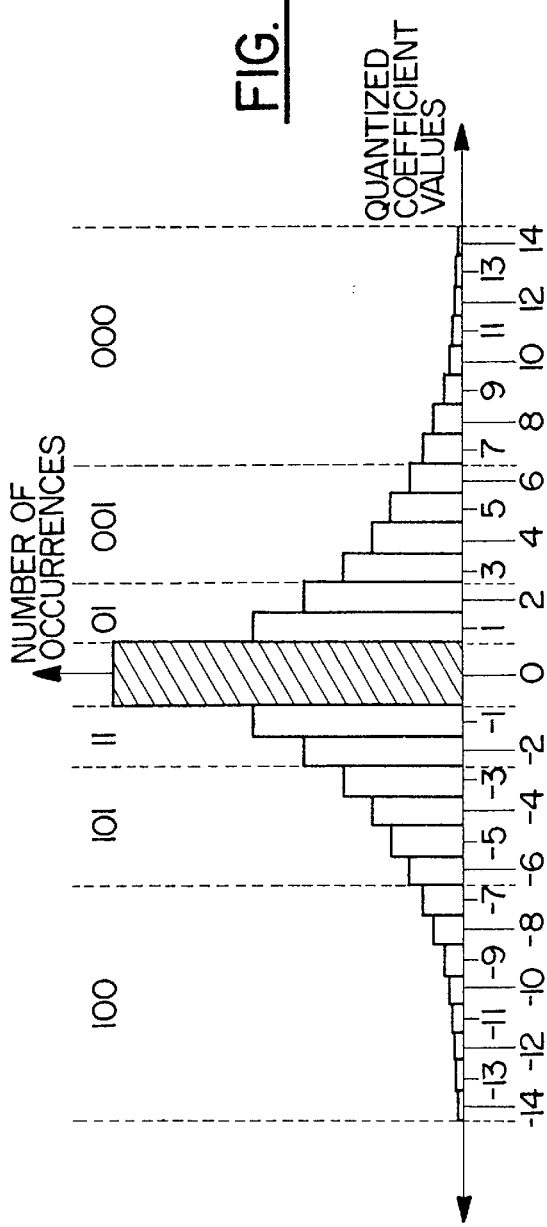

ERROR RESILIENT METHOD AND APPARATUS FOR ENTROPY CODING

FIELD OF THE INVENTION

The present invention relates generally to methods and apparatus for compressing and decompressing data by entropy encoding and decoding and, more particularly, to error resilient methods and apparatus for entropy encoding and decoding. The present invention further relates to the application of said error resilient entropy coding methods and apparatus to image compression.

BACKGROUND OF THE INVENTION

In order to transmit data over channels with limited throughput rates or to store data in limited memory space, it is frequently necessary to compress the data so as to represent the data with fewer bits. Upon receiving or retrieving the compressed data, the data may be decompressed to recover the original data or an approximation thereof.

Compression and decompression techniques are commonly applied to imagery data in order to reduce otherwise massive transmission and storage requirements. By way of example, a single monochrome image is typically formed by an array of pixels, such as a 512×512 array of pixels. In addition, the intensity level of each pixel is generally assigned a numeric value between 0 and 255 which is digitally represented by an 8 bit pattern. Therefore, the digital representation of such a monochrome image requires approximately 2 million bits of data. As a further example, a typical digital color video format is the Common Intermediate Format (CIF) having a resolution of 360×288. This color video format includes three color components which are each represented as an array of pixels which are displayed at a rate of 30 frames per second. The three color components are an intensity component at full resolution (360×288) and two chrominance components at half resolution (180×144) each. Thus, the total throughput requirement for CIF is about 37 million bits per second. Thus, the transmission of uncompressed digital imagery requires relatively high throughput rates or, alternatively, relatively long transmission times. Likewise, the storage of digital imagery requires relatively large memory or storage devices.

In order to reduce the storage and transmission requirements for image processing applications, a variety of image compression techniques have been developed. Substantial compression of imagery is possible due to the statistical redundancy typically found in image data. Such redundancy takes several forms, namely, spatial redundancy due to correlation between spatially proximate pixels, temporal redundancy due to correlation between successive frames in an image sequence, and spectral redundancy between the color planes or bands of multispectral images.

Image compression techniques attempt to reduce the volume of data by removing these redundancies. Image compression techniques fall into two broad categories: "lossless" and "lossy". With lossless image compression, a reconstructed image is guaranteed to be identical to the original image. Unfortunately, lossless approaches can provide only a very limited amount of compression (typically less than 3:1). In contrast, lossy techniques achieve higher compression ratios by allowing some of the visual information to be removed, thereby resulting in a difference or distortion between the original image and the reconstructed image. To minimize the perceived or subjective distortion of the reconstructed image, the removal of information should ideally take into account the characteristics of the human visual system (HVS). Since subjective distortion is difficult to characterize quantitatively, however, numerical measures of distortion are commonly used with the most popular measure being RMS error, i.e., the square root of the mean squared pixel intensity differences between the original and reconstructed images. In general, higher compression ratios can be achieved by tolerating higher distortion. Finally, if the distortion from a lossy compression process is not visually apparent under normal viewing conditions, the compression is termed a "visually lossless" image compression.

A common approach to image compression, called transform-based compression or transform coding, involves three primary steps, namely, a transform step, a quantization step, and an encoding step. See, for example, an article entitled "High-Resolution Still Picture Compression" by M. V. Wickerhauser dated Apr. 19, 1992 which is available on the Internet as "http://wuarchive.wustl.edu/doc/techreports/wustl.edu/m ath/papers/dsp.ps.Z". As described in U.S. Pat. No. 5,014,134 to Wayne M. Lawton, et al. and U.S. Pat. No. 4,817,182 to Adelson, et al., an invertible transform decomposes the original image data into a weighted sum of simple building blocks, called basis functions, such as sinusoids or wavelet functions. Accordingly, a number of image transforms have been developed, including the Fourier transform, the discrete cosine transform and the wavelet transform. If the basis functions have sufficient correspondence to the correlation structure of the imagery to be compressed, most of the energy (or information) in the image will be concentrated into relatively few of the transform coefficients with correspondingly large coefficient values. Consequently, most of the remaining transform coefficients will have small or zero coefficient values.

The wavelet transform decorrelates the image data at multiple resolutions by use of basis functions which are dilations and translations of a single prototype function. The prototype basis function is a bandpass filter called a "wavelet", so named because the filter is both oscillatory and spatially localized. The translations and dilations of the prototype wavelet yield a set of basis functions which produce a signal or image decomposition localized in position and resolution, respectively.

As known to those skilled in the art, the wavelet transform can be efficiently computed using a fast discrete algorithm, called the Fast Wavelet Transform (FWT), which recursively applies the wavelet filter and a companion lowpass filter called a "scaling" filter. For a single iteration of the FWT applied to a one-dimensional signal, the wavelet and scaling filters are convolved against the signal, followed by a decimation by two. This process splits the signal into a low resolution approximation signal (extracted by the scaling filter) and a high resolution detail signal (extracted by the wavelet filter). By recursively applying the wavelet filter and the scaling filter to the low resolution approximation signal generated by the prior iteration of the FWT, a multiresolution decomposition of the original signal is produced which consists of the detail signals at various resolutions and a final low resolution approximation signal.

The wavelet transform can be easily extended to two-dimensional imagery by separately filtering the rows and columns and by iteratively processing the lowpass approximation image. This wavelet transform is equivalent to decomposing the image in terms of basis functions which are 2-D tensor products of the 1-D wavelet and scaling filters. See, for example, in U.S. Pat. Nos. 5,014,134 and 4,817,182, the contents of which are expressly incorporated by reference herein. See also Oliver Rioul, et al., "Wavelets and Signal Processing", IEEE Signal Processing Magazine, pp. 14–38 (October 1991); Bjorn Jawerth, et al., "An Overview of Wavelet-Based Multi-Resolution Analyses", SIAM Review, Vol. 36, No. 3, pp. 377–412 (1994); and Michael L. Hilton, et al., "Compressing Still and Moving Images with Wavelets", Multimedia Systems, Vol. 2, No. 3 (1994) for further descriptions of the wavelet transform.

Once the image data has been transformed, the compression algorithm then proceeds to quantize and encode the transform coefficients which are generated by the wavelet transform. The quantization step discards some of the image content by approximating the coefficient values. As known to those skilled in the art, a quantization is a mapping from many (or a continuum) of input values to a smaller, finite number of output levels. The quantization step divides the range of input values by a set of thresholds $\{t_i, i=0, \ldots, N-1\}$ and maps an input value falling within the interval ($t_i$, $t_{i+1}$] to the output value represented by the discrete symbol or variable i. Correspondingly, dequantization (used to recover approximate coefficient values during decompression) maps the discrete variable i to a reconstructed value $r_i$ which lies in the same interval, i.e., ($t_i$, $t_{i+1}$]. For minimum mean squared error, the reconstructed value should correspond to the mean of those coefficient values falling within the interval, but, in practice, a reconstruction value at the center of the interval is often used. Further, scalar quantization maps a single scalar value to a single discrete variable, whereas vector quantization jointly maps a plurality (or vector) of M values to each discrete variable.

While the quantized coefficient values have reduced precision, they also can be represented with fewer bits, thus allowing higher compression at the expense of distortion in the reconstructed image. This image distortion is referred to as quantization error and accounts for all of the distortion inherent in lossy compression schemes. Thus, the quantization step is omitted for lossless compression approaches.

As known to those skilled in the art, a variety of factors contribute to the choice of the actual quantization intervals, such as the desired compression ratio, the statistical distribution of the coefficient values, the manner in which the quantized coefficient values will be encoded, and the distortion metric used to measure image degradation. When the quantized coefficients will be entropy-coded, mean squared error can be (approximately) minimized by using uniform quantization intervals. See R. C. Wood, "On Optimum Quantization", IEEE Transactions on Information Theory, Vol. 15, pp. 248–52 (1969). In the absence of entropy coding, the mean squared error is minimized by choosing nonuniform quantization intervals in accordance with the Lloyd-Max algorithm as described in S. P. Lloyd, "Least Squares Quantization in PCM", Bell Lab. Memo. (July 1957), reprinted in IEEE Transactions on Information Theory, Vol. 28, pp. 129–37 (1982), and also in J. Max, "Quantizing for Minimum Distortion", IRE Transactions on Information Theory, Vol. 6, pp. 7–12 (1960).

Due to the decorrelating properties of the wavelet transform, the distribution of transform coefficient values is typically sharply peaked at zero. This type of coefficient distribution results in a preponderance of coefficients falling into the quantization interval at the origin, i.e., the quantization interval centered on the value of zero. Due to the preponderance of coefficients near zero, more efficient compression performance can be achieved by treating the quantization interval at the origin separately. In particular, the overall coding efficiency may be increased by using a larger quantization interval around the origin, often called a "dead zone". In one preferred embodiment, the dead zone interval is twice as large as the adjacent intervals. The dead zone is centered about the origin with a reconstruction value exactly equal to zero to prevent artifacts resulting from the use of nonzero reconstruction values for the many coefficients close to zero. The magnitude of the positive and negative bounds of the dead zone is often termed the "clipping threshold" because all coefficients whose magnitudes fall below this threshold are "clipped" to zero. In addition, those coefficients whose magnitudes exceed the clipping threshold are termed "significant" coefficients, while those coefficients whose values lie below the threshold are termed "insignificant" coefficients.

Because most of the coefficients produced by the transform have small magnitudes or are equal to zero, the quantization process typically results in the majority of the coefficients being deemed insignificant, while only relatively few of the quantized coefficients have magnitudes exceeding the clipping threshold which are deemed significant. Thus, as indicated above, it is advantageous to treat the significant coefficients separately from the insignificant coefficients.

In one preferred embodiment, this separate treatment is accomplished by separately indicating the positions and the quantized values of the significant coefficients. To achieve further compression, the quantized values of the significant coefficients may then be entropy coded using a technique known to those skilled in the art, such as Huffman coding or arithmetic coding. In addition, the positions of the significant coefficients can be represented using one of a variety of conventional approaches, such as tree structures, coefficient maps, or run length coding. In one preferred embodiment, the positions of the significant coefficients are represented by means of run lengths of consecutively occurring insignificant coefficients. The resulting position representation may then be entropy coded to obtain additional compression.

As known to those skilled in the art, entropy coding reduces the number of bits required to represent a data set by using variable length coding in a manner which exploits the statistical probabilities of various symbols in the data set. For example, entropy coding assigns shorter code words to those symbols which occur frequently, while longer code words are assigned to those symbols which occur less frequently. A number of different entropy coding approaches have been developed including Huffman coding which represents the data symbols using code words that each have a length consisting of an integer number of bits, and arithmetic coding which is capable of producing code words whose length is a fractional number of bits. Entropy coding is completely reversible so that no additional distortion is introduced beyond that due to the quantization process.

The assignment of code words for entropy coding is typically governed by means of a codebook which must be known to both the encoder and decoder. If the statistics of the data sets to be encoded are unstable or unknown, then the codebook itself or the statistics from which the codebook may be generated must be transmitted along with the entropy encoded data. In this event, any such codebook or statistics which must be transmitted to the decoder is referred to as "side information". A significant issue in the design of entropy coding schemes is the reduction of side information. In many cases, it is beneficial to estimate and transmit as side information only an approximation of the symbol statistics because the resulting reduction in side information may outweigh any loss of coding efficiency resulting from the approximation of the symbol statistics.

Once an image is compressed, the compressed image is typically transmitted over a communications link or stored in a medium, such as a magnetic disk. In this context, the communications or storage medium is referred to as the "channel". A digital data set, such as a compressed image, conveyed through such a channel is subject to corruption of some of the bits, thereby creating erroneous bit values. The rate at which erroneous bit values occur is termed the bit error rate (BER) of the channel. If the BER is sufficiently low, the incidence of errors is infrequent and may safely be ignored. For higher BERs, however, additional measures must be employed to maintain the integrity of the data. One approach known as Automatic Repeat reQuest (ARQ) is to use communications protocols which provide mechanisms for detecting errors and repeatedly transmitting corrupted data packets.

However, for continuous streams of data or for channels with high BERs, the delays due to retransmission and protocol handshaking required by ARQ may be unacceptable.

As known to those skilled in the art, another approach uses channel coding (also called forward error coding (FEC)) which further encodes the data so that channel errors may be detected and, in some instances, corrected with high probability. Channel coding can detect and correct some bit errors by adding redundancy to the data in a controlled fashion. The effectiveness of channel coding is related to the amount of redundancy employed. By adding more redundancy, channel coding can effectively detect and correct a higher level of errors. The downside of channel coding is that the redundancy introduced can consume a significant percentage of the channel bandwidth (typically in the range of 10% to 90% of the channel bandwidth depending on the level of error detection and correction required).

As known to those skilled in the art, one variant of channel coding uses an approach called Unequal Error Protection (UEP) which separates a data set into several subsets and provides different levels of error protection for each subset by varying the amount of redundancy for each subset. The rationale for UEP is that different subsets of a data set may vary in importance. The most important data may require correction of virtually all bit errors, whereas some higher level of bit errors may be acceptable in less important data. By providing lower levels of protection to the less important subsets of the data, the amount of redundancy added by the channel coding can be reduced, and channel bandwidth may correspondingly be conserved.

An unfortunate consequence of data compression is the increased susceptibility of the compressed data to channel errors. For uncompressed image data, the effects of bit errors are localized to the affected pixel(s) and are manifested as "salt and pepper" noise. On the other hand, image compression algorithms concentrate the information or energy of an image into fewer bits so that the effects of even a single bit error can be far-reaching. The susceptibility of the compressed data to channel errors and the resultant effects on the reconstructed data depend on the manner in which the data was compressed and the particular bit(s) which is/are corrupted.

For example, a bit error which causes a transform coefficient value to be misdecoded introduces a noise artifact in the reconstructed image consisting of the corresponding basis function scaled according to the magnitude of the error on the misdecoded coefficient. Such artifacts may be tolerable because the image noise associated with a few perturbed basis functions is often not sufficient to severely hamper the recognition of image content. If the coefficient magnitudes are encoded differentially, however, the effects of such an error may persist for all coefficients which are dependent on the misdecoded coefficient. In this case, the resulting artifact will be an undesirable streak across the reconstructed image.

As previously mentioned, the positions of the significant coefficients are commonly represented using tree structures, coefficient maps or run length coding. Such representations often represent the position of a given coefficient relative to a previously designated coefficient position. Thus, a bit error which causes the position of a significant coefficient value to be misdecoded can also introduce errors in the positions of succeeding coefficients. In other words, the image content associated with the corrupted coefficient positions is misplaced within the reconstructed image, thereby producing an effect called "tearing" characterized by a displacement of a portion of the image which is sometimes catastrophic.

A bit error on entropy-coded data can, due to the variable length of the code words, cause a loss of code word synchronization which may persist for all succeeding data, thereby resulting in catastrophic effects on a reconstructed image. Because bit errors on compressed data can result in a variety of catastrophic effects as described above, it is imperative that some form of error protection be provided for compressed data which will be transmitted through a noisy channel. However, such error protection increases the amount of information which must be transmitted over the noisy channel, thereby decreasing the efficiency or speed at which the compressed data is transmitted as described above.

SUMMARY OF THE INVENTION

It is therefore an object of the present invention to provide an improved error resilient method and apparatus for entropy coding of data which can utilize unequal error protection techniques of channel coding.

It is another object of the present invention to provide an error resilient method and apparatus which isolates the effects of a bit error to a single code word and which constrains the resulting error on the decoded value such that a misdecoded value falls within a constrained or limited interval about the correct value.

It is a further object of the present invention to provide an improved method and apparatus for image compression which utilizes error resilient entropy coding which, in turn, can utilize unequal error protection techniques of channel coding.

These and other objects are provided, according to the present invention, by an error resilient method and apparatus for entropy coding of data which includes code word generating means for generating a plurality of code words representative of respective items in the data set. Each code word has two portions which we shall hereafter refer to as "fields", namely, a first or prefix field which is susceptible to bit errors, and an associated second or suffix field which is resilient to bit errors. As explained hereinafter, the code words can be generated such that a bit error in the prefix field of a code word could result in a potential loss of code word synchronization, while a bit error in the suffix field of a code word shall only effect that particular code word. In particular, the code words can be generated such that a bit error in the suffix field of a code word will not result in a loss of code word synchronization, but the resulting misdecoded value shall, instead, fall within a predetermined interval about the correct value. Thus, according to the present invention, the error resilient method and apparatus for entropy coding of data shall be suitable for use with unequal error protection means such that the prefix fields are channel encoded with a relatively higher level of error protection and the suffix fields are channel encoded with a relatively lower level of error protection, if any at all.

According to one embodiment, the code word generating means includes prefix generating means and suffix generating means for generating the prefix and suffix fields of each code word, respectively. In particular, the prefix field includes information representative of a predetermined characteristic of the associated suffix field. Preferably, each prefix field includes information representative of the predetermined number of characters, such as bits, which form the associated suffix field of the code word. In addition, each suffix field includes information representative of respective portions of the original data. Each suffix field is also formed of a specific number of characters with the specific number designated by the associated prefix field of the code word. Consequently, even though the suffix fields are not error protected or are only provided with a relatively low level of error protection, the method and apparatus of the present invention can correctly determine the length of the suffix field of a code word even if there should be of one or more bit errors within the said suffix field, provided that the associated prefix field is decoded correctly, i.e., without the occurrence of a bit error. Accordingly, in order to provide a high probability that the prefix field is decoded correctly, the method and apparatus of the present invention preferably channel encodes the prefix field with a relatively high level of error protection.

In instances in which the encoded data is to be stored in a storage medium subject to bit errors, the respective prefix fields of the plurality of code words can be provided with an appropriately high level of error protection by storing the prefix fields in a first data block of a storage medium which is afforded an appropriately high level of error protection. In order to reduce the storage requirements, the suffix fields associated with the respective prefix fields can be stored in a second data block of the storage medium which is afforded a relatively lower level of error protection or no error protection. Alternatively, in instances in which the encoded data is to be transmitted over a transmission medium subject to bit errors, the respective prefix fields of the plurality of code words can be transmitted over a first data link, such as by a first data link transmitting means. Likewise, the suffix fields associated with the respective prefix fields can be transmitted over a second data link, such as by a second data link transmitting means. According to the present invention, the first data link is preferably afforded an appropriately high level of error protection. However, the method and apparatus of the present invention can reduce the data link bandwidth requirements by affording the second data link a relatively lower level of error protection or no error protection.

The error resilient method and apparatus for encoding data of the present invention can form a portion of an error resilient method and apparatus for compressing data. According to this embodiment, the error resilient method and apparatus for compressing data also includes a data transformer for transforming the original data based upon a predetermined transformation function. For example, the data can be transformed based upon a wavelet transform, and, more preferably, a biorthogonal wavelet transform.

The error resilient method and apparatus for compressing data also includes a data quantizer for quantizing the transformed data such that the quantized data has fewer unique data values or coefficients than the transformed data. During subsequent decompression, a dequantizer can, at least in part, reverse the quantization process by mapping the quantized data to reconstructed values which approximate the original data values.

The statistics of the quantized coefficients can be characterized using a "histogram" which is a discrete distribution consisting of a number of individual "bins", each of which represent the frequency or probability of occurrence of a quantized coefficient value. In other words, each bin is associated with a particular quantization interval which has as its frequency a count of the number of occurrences of coefficients whose values fall within the associated quantization interval.

According to one advantageous embodiment of the error resilient method and apparatus for encoding data of the present invention, the prefix field of each code word includes information representative of the number of bits K which form the associated suffix field of the code word. Furthermore, the prefix field can also include information representative of a specific set of $2^K$ consecutive histogram bins of the quantized coefficient histogram which are, in turn, associated with a corresponding set of $2^K$ consecutive quantized coefficient values. The $2^K$ possible values for the associated K bit suffix field will each be associated by one-to-one correspondence with the $2^K$ consecutive bins which are designated by the associated prefix field. In aggregate, the prefix and suffix field of each code word shall together include information representative of a specific symbol associated with a specific bin of the quantized coefficient histogram.

In other words, the prefix field includes the information representative of a set of consecutive quantized coefficient values while the suffix field includes the information representative of a specific coefficient value among the set designated by the prefix field. Thus, if the prefix field of a code word is decoded correctly, i.e., without the occurrence of a bit error, the length of the associated suffix field and the range of consecutive coefficient values which may be represented by the associated suffix field will have been determined. As a result, the effects of one or more bit errors on the suffix field will be isolated to a specific code word, thereby limiting such errors to a misdecoded coefficient value which is constrained to that range of values determined by the prefix field. Accordingly, the error resilient method and apparatus for encoding data according to the present invention effectively reduces, if not prevents, catastrophic errors in an efficient manner.

BRIEF DESCRIPTION OF THE DRAWINGS

FIG. 5A is a sample distribution of wavelet transform coefficient values.

FIG. 5B is a histogram illustrating the relative frequency of occurrence of exemplary quantized data values.

DETAILED DESCRIPTION OF THE PREFERRED EMBODIMENT

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
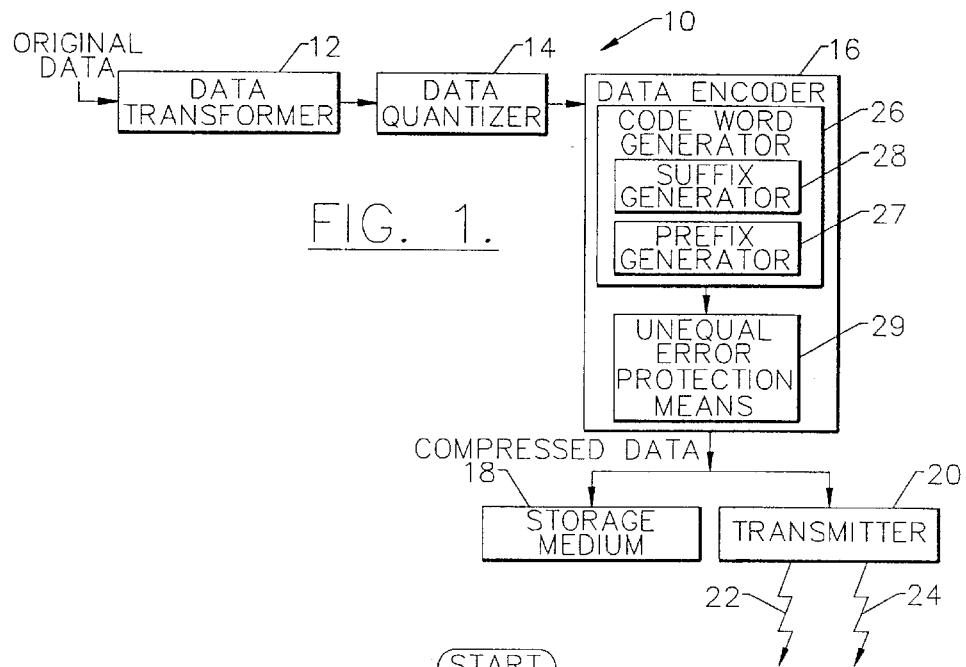
FIG. 1 is a block diagram of an error resilient data compression apparatus, including an error resilient data encoder, according to one embodiment of the present invention.

According to the present invention, an error resilient method and apparatus for encoding data is provided. As illustrated in FIG. 1, the error resilient method and apparatus for encoding data can form one portion of a method and apparatus 10 for compressing data which is thereinafter stored and/or transmitted. However, the error resilient method and apparatus for encoding data can be employed in other applications, including applications in which the data has not been transformed and quantized as shown in FIG. 1 and described hereinafter, without departing from the spirit and scope of the present invention.

Figure 2:
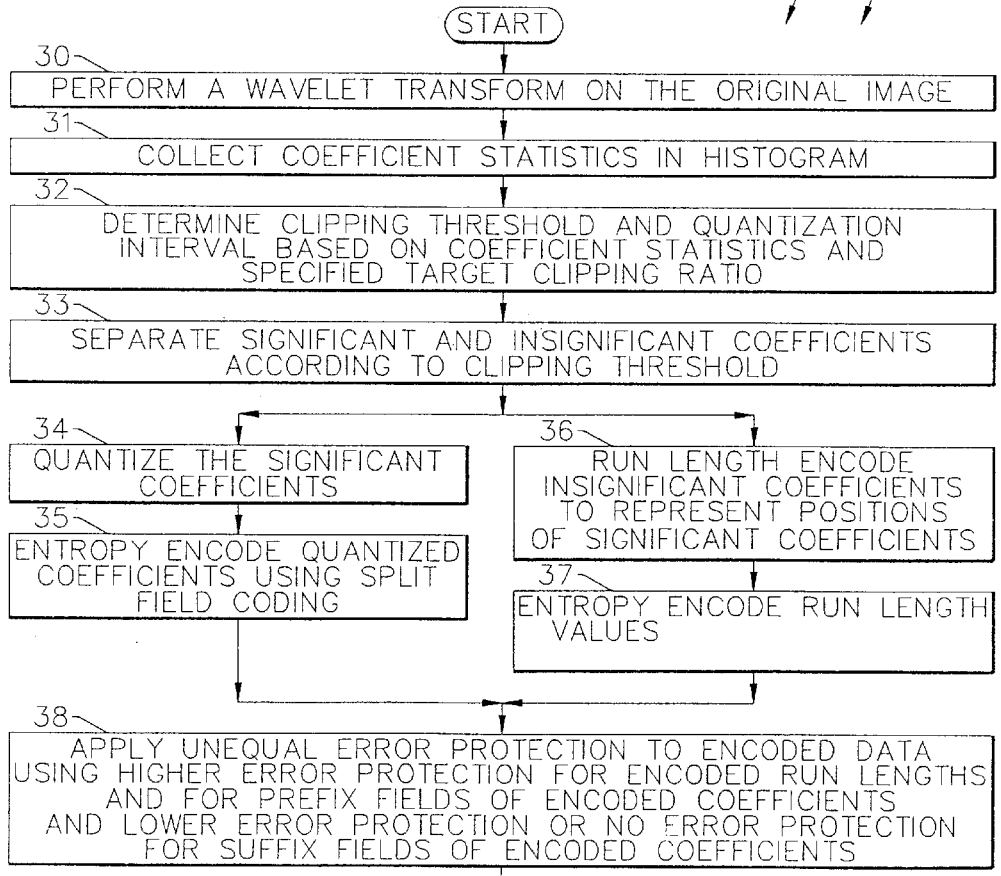
FIG. 2 is a flow chart illustrating operations for compressing data, including operations for encoding data, according to one embodiment of the present invention.

According to the present invention as shown in FIG. 1 and, in more detail, in block 30 of FIG. 2, the original data is initially transformed, such as by a data transformer 12. In one particularly useful application, the original data is a monochromatic image formed by an array of pixels, such as a 512×480 array of pixels, each of which has a gray level which can be digitally represented, such as by an 8-bit binary representation. However, the method and apparatus of the present invention can encode other types of data without departing from the spirit and scope of the present invention.

As known to those skilled in the art, the original data can be transformed based upon a one of a number of predetermined transforms, each of which describes the signal in terms of a set of functions called basis functions, such as cosine functions or complex exponentials (general sinusoids). However, one particularly advantageous transform is a wavelet transform and, more particularly, a biorthogonal wavelet transform which represents a function in terms of biorthogonal wavelets as described in A. Cohen, "Biorthogonal Wavelets", Wavelets—*A Tutorial in Theory and Applications*, C. K. Chui (ed.) (1992).

As known to those skilled in the art, a wavelet transform filters a signal using a pair of digital filters, typically referred to as a scaling filter and a wavelet filter. The scaling filter is a lowpass filter which generates a lower frequency approximation signal. In contrast, the wavelet filter is a high-pass filter which extracts a higher frequency detail signal. Because the filters split the information of the original signal into two frequency bands, the filtered signals can be subsampled, i.e., every other data point may be discarded, without losing information. By recursively applying the scaling filter and wavelet filter to the approximation signal of the prior iteration, the original signal can be decomposed into multiple resolutions.

The wavelet transform can be easily extended to two-dimensional imagery by separately filtering the rows and columns of the 2-D image. This process is equivalent to filtering the image using a set of four 2-D filters which are 2-D tensor products of the 1-D scaling and wavelet filters. This filtering in 2-D produces four subband images, namely, an approximation image resulting from lowpass filtering by the scaling filter in both dimensions and three detail images resulting from highpass filtering in at least one dimension. By recursively applying the scaling filter and wavelet filter to the approximation image of the prior iteration, the original 2-D image can be decomposed into multiple resolutions.

Figure 3:
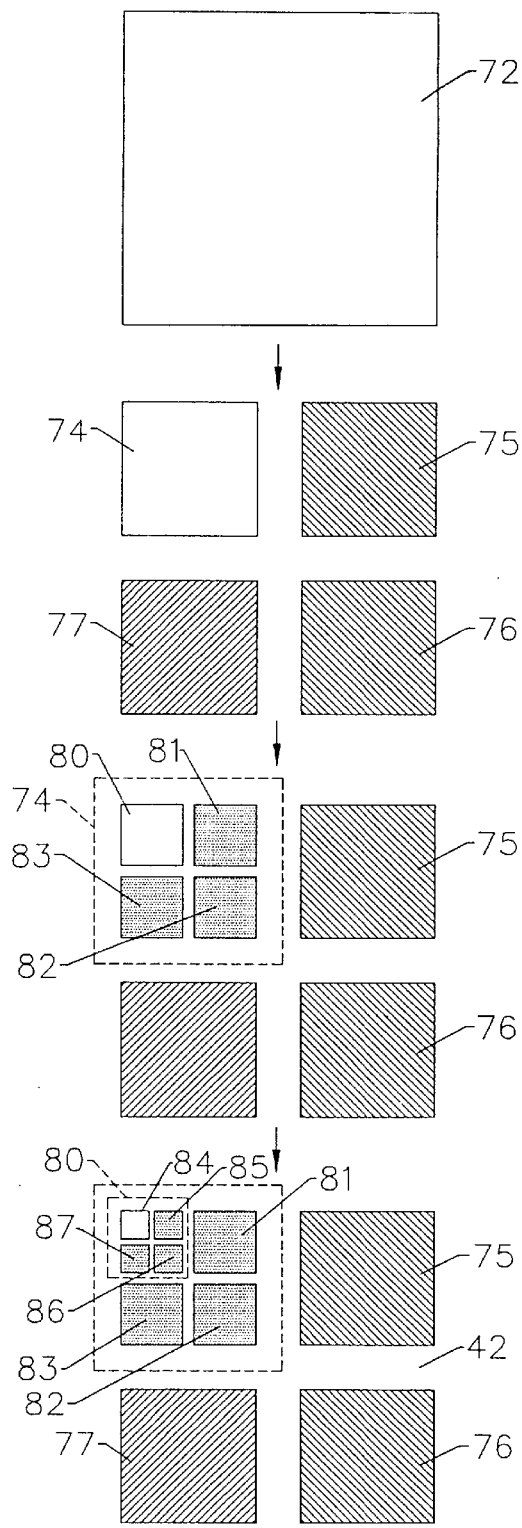
FIG. 3 illustrates the decomposition of an original image into a plurality of higher resolution detail images and one lower resolution approximation image.

By way of example, FIG. 3 depicts the results of the filtering process after each of three iterations. At each iteration, the resulting approximation image is shown in white and the three detail images are shaded. As shown, the first iteration decomposes the original image 72 into four subband images 74–77 at a fine scale or resolution which shall be referred to as scale 1 for purposes of illustration. The second iteration decomposes the approximation image 74 from scale 1 into four subband images 80–83 at the next coarsest scale which shall be referred to as scale 2. The third iteration repeats the process, thereby decomposing the approximation image 80 from scale 2 into four subband images 84–87 at scale 3. The process is typically iterated to a very coarse scale at which the subband images are very small, e.g., on the order of 8×8. The resulting multiresolution wavelet decomposition of the original image 72 is typically decorrelated such that redundancies, such as spatial redundancies, within the original data can be exploited during the compression process. See U.S. Pat. No. 5,014,134 for a further description of an exemplary wavelet transformation process. For convenience, the elements of the various component images are hereafter referred to as pixels, even though these elements are not true picture elements, but are coefficients of the transformed image.

While a number of wavelet and scaling filters have been developed to decorrelate image data, the data transformer 12 of the present invention preferably includes biorthogonal scaling and wavelet filters having lengths of 5 and 3, respectively; 9 and 3, respectively or 2 and 6, respectively. For example, a digital scaling filter of length 5 can be represented by the following coefficients:

$$-\frac{1}{8} \quad \frac{2}{8} \quad \frac{6}{8} \quad \frac{2}{8} \quad -\frac{1}{8}$$

while the digital wavelet filter of length 3 can be represented by the following coefficients:

$$-\frac{1}{4} \quad \frac{2}{4} \quad -\frac{1}{4}$$

During the transformation process, the original image data is convolved with the scaling and wavelet filters to create the approximation and detail images, respectively. For the exemplary filter pairs defined by the above-listed coefficients, the convolution of a row or column of the image data with the scaling filter can be implemented as follows:

$$a(n) = -\frac{1}{8} x(2n-1) + \frac{2}{8} x(2n) +$$
$$\frac{6}{8} x(2n+1) + \frac{2}{8} x(2n+2) - \frac{1}{8} x(2n+3)$$

wherein x(n) is a discrete signal representative of gray level of the pixels being convolved, a(n) is an approximation coefficient resulting from the convolution, and n is an index or pointer into the various pixels within a row or column of the image array or into the resulting array of approximation coefficients.

Similarly, the convolution of a row or column of image data with the wavelet filter can be implemented as follows:

$$d(n) = -\frac{1}{4} x(2n-1) + \frac{2}{4} x(2n) - \frac{1}{4} x(2n+1)$$

wherein d(n) is a detail coefficient resulting from the convolution.

For computational efficiency, the convolution of the image data with the wavelet filter can be initially performed and the result d(n) can be utilized in the convolution of the image data with the scaling filter as follows:

$$a(n) = \frac{1}{2} d(n) + x(2n+1) + \frac{1}{2} d(n+1)$$

While exemplary coefficients defining the digital wavelet and scaling filters are provided above and utilized in the above equations, a variety of wavelet and scaling filters can be employed without departing from the spirit and scope of the present invention.

As known to those skilled in the art, the scaling and wavelet filters are typically convolved with the array of pixels on a row-by-row basis, followed by a convolution of the scaling and wavelet filters with the array of pixels on a column-by-column basis. As described above, the scaling and wavelet filters are recursively applied to the approximation image of the prior iteration to decompose the image data into multiple resolutions.

Following the transform, the original image 72 is represented by a number of detail images 75–77, 81–83 and 85–89 of varying resolution and one approximation image 84 at the coarsest resolution. As shown in FIG. 3, each of these images is comprised of an individual array of pixels which forms a portion of an overall array of pixels 42.

The transformed data is then quantized, such as by a data quantizer 14, such that the quantized data has fewer unique data values or coefficients than the transformed data, as shown in block 34 of FIG. 2. As known to those skilled in the art, a quantizer maps from many (or a continuum) of input values to a smaller, finite number of output levels. The quantizer divides the range of input values by a set of thresholds $\{t_i, i=0, \ldots, N-1\}$. The quantizer then maps an input value falling into an interval $(t_i, t_{i+1}]$ to an output level designated by the discrete symbol i. During decompression, a dequantizer which is designed to recover approximate coefficient values of the transformed data can map the discrete symbol i to a reconstructed value $r_i$ which lies in the same interval, i.e, the interval $(t_i, t_{i+1}]$. To minimize the mean squared error, the reconstructed value preferably corresponds to the mean of those coefficient values falling within the interval. However, the reconstructed value can be assigned other values with the interval, such as a value at the center of the interval for purposes of simplicity.

Figure 7:
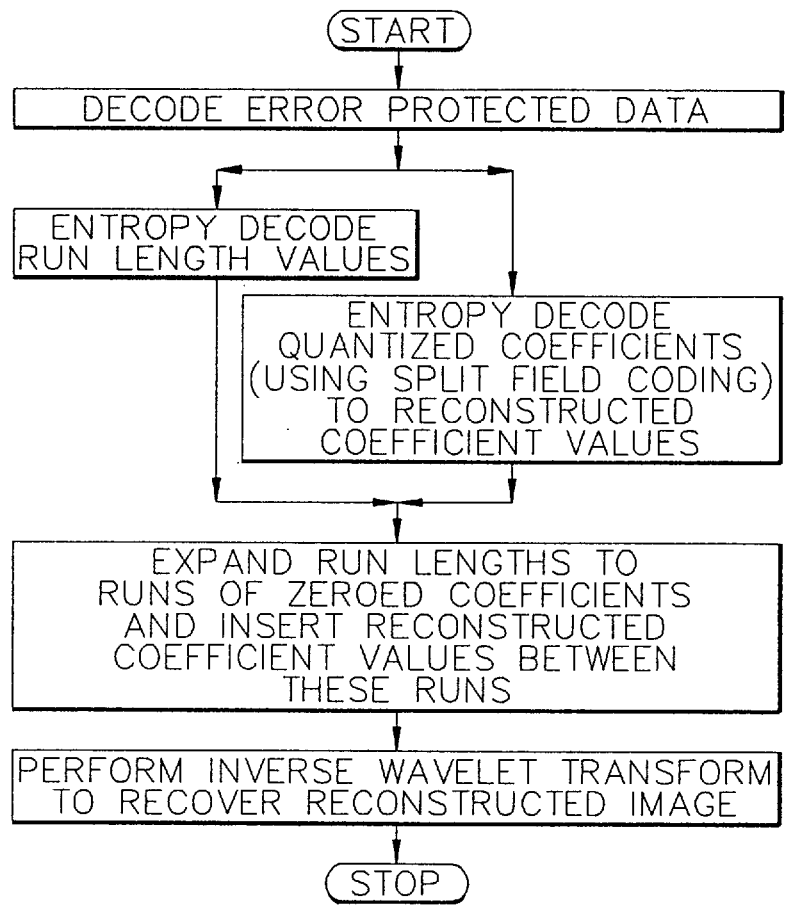
FIG. 7 is a flow chart illustrating operations for decompressing data which has been encoded according to one embodiment of the present invention.

According to one embodiment, the threshold of smallest magnitude is referred to as the "clipping threshold". Thus, the transformed coefficients whose magnitudes fall below the clipping threshold level can be detected and designated as insignificant coefficients. As described below and as shown in FIG. 7, these insignificant coefficients will be set to zero in the resulting reconstructed image. In contrast, the transformed coefficients whose magnitudes are greater than or equal to the clipping threshold can be detected, designated as significant coefficients, and further quantized.

Figure 4:
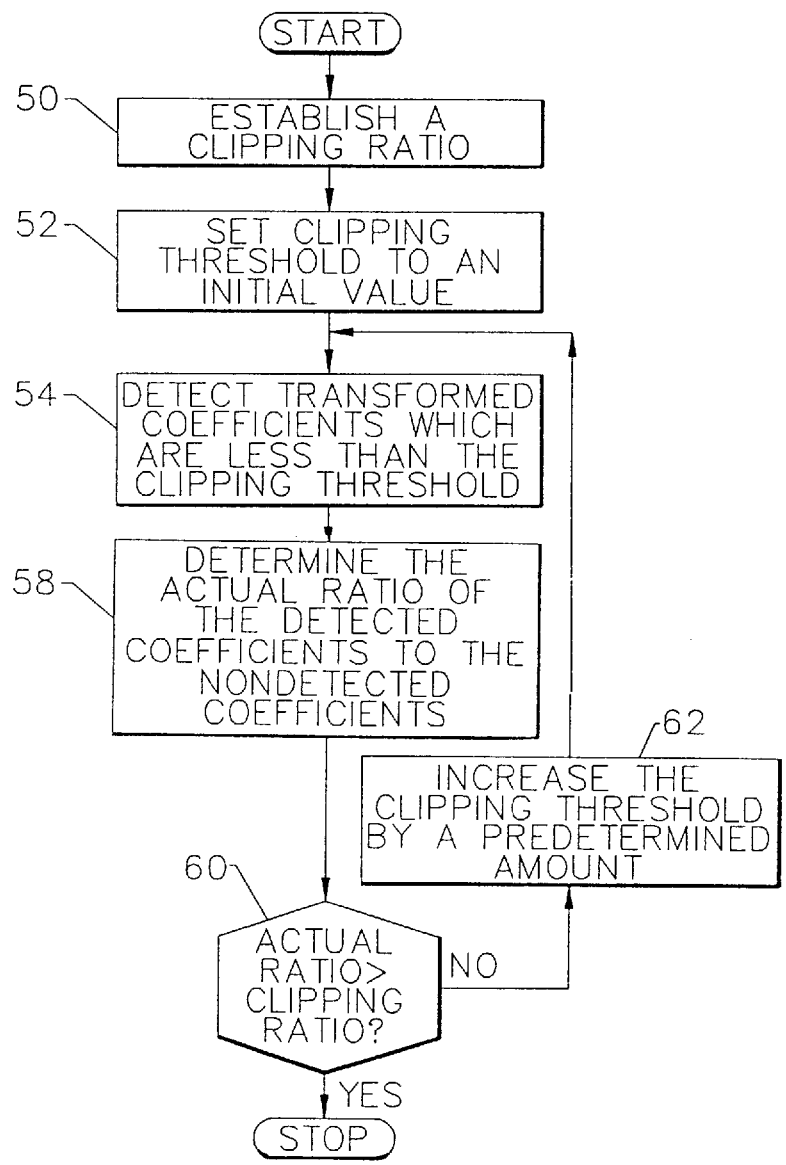
FIG. 4 is a flow chart illustrating operations for quantizing the transformed data according to one embodiment of the present invention.

The error resilient method and apparatus for compressing data can also initially establish the clipping threshold level to ensure that a predetermined percentage of the transformed coefficients are designated as insignificant coefficients. According to one embodiment as shown in block 50 of FIG. 4, a target clipping ratio, such as 50:1, is set by the user or is fixed for the application. The clipping ratio defines the ratio of the number of insignificant coefficients to the number of significant coefficients. As described hereinafter and as shown in block 32 of FIG. 2, the method and apparatus of the present invention can then set the clipping threshold to the smallest threshold for which the resulting clipping ratio equals or exceeds the target clipping ratio. As known to those skilled in the art, a higher compression ratio can be obtained by higher clipping ratios. However, the amount of distortion in the reconstructed image also increases with an increase in the clipping ratio.

As also known to those skilled in the art, the statistics of the transform coefficients may be collected in a global coefficient histogram as shown in block 31 of FIG. 2. In particular, the histogram includes a plurality of bins which represent the number of occurrences of one or more associated coefficient values as shown in FIG. 5B. The coefficient statistics and the target clipping ratio are together used to determine the clipping threshold as shown in block 32 of FIG. 2 and, in more detail, in FIG. 4. In particular, the clipping threshold is initialized, such as to 1, as shown in block 52. By summing appropriate bins of the histogram which represent coefficient values that are less than the clipping threshold as shown in block 54, the count of insignificant coefficients which are less than the clipping threshold is determined and the resulting clipping ratio is computed as shown in block 58. A comparison of the actual and target clipping ratios can then be made as shown in block 60. If the actual clipping ratio is less than the target clipping ratio, the clipping threshold can be incremented as shown in block 62 and the above-described process can be repeated. If the actual ratio equals or exceeds the target clipping ratio, however, the appropriate clipping threshold has been determined.

Once the clipping threshold is determined, the significant coefficients which equal or exceed the clipping threshold are separated from the insignificant coefficients as shown in block 33, and are quantized as known to those skilled in the art and as shown in block 34. Because the coefficient distribution is typically sharply peaked at zero as indicated in the stylized distribution of FIG. 5A, the insignificant coefficients (which will be reconstructed as zeros) are numerous and can be encoded very efficiently. In one preferred embodiment, the insignificant coefficients are encoded by a combination of run length coding, as shown in block 36, and entropy coding, as shown in block 37. Note that encoding the insignificant coefficients by run lengths is equivalent to encoding the relative positions of the significant coefficients.

Because the insignificant coefficients can be encoded very efficiently, it is advantageous to construct the quantization interval which is centered about the origin and which is bounded by plus or minus the clipping threshold larger than the nominal quantization interval. In one preferred embodiment, the nominal quantization interval is set equal to the clipping threshold. As a result, the nominal quantization interval is equal to half the size of the quantization interval centered about the origin. For purposes of illustration, a wider quantization interval centered about the origin is indicated in the quantized coefficient histogram depicted in FIG. 5B.

Typically, a uniform quantizer is used such that all quantization intervals (other than the quantization interval centered at the origin) are set equal to the nominal quantization interval, thereby minimizing mean squared error. However, the data quantizer can quantize the transformed data nonuniformly without departing from the spirit and scope of the present invention.

Once the transformed data has been quantized, the quantized significant coefficients can be encoded by the error resilient method and apparatus for encoding data as shown in block 35. The insignificant coefficients can be run length coded to generate run length values which are thereafter entropy encoded by the error resilient method and apparatus for encoding data of the present invention or by another method, such as Huffman coding, as shown in blocks 36 and 37 of FIG. 2.

Due to the transformation and quantization processes as described above, the quantized data can be well approximated by a Laplacian or, more preferably, a generalized Gaussian distribution which is sharply peaked at the origin. A stylized generalized Gaussian distribution is shown in FIG. 5A for purposes of illustration since actual distributions are typically noisy and are more sharply peaked at the origin.

The data encoder 16 of the present invention can encode the quantized data according to a predetermined codebook. In particular, both the quantized significant coefficients and their relative positions within the array of pixels are encoded to thereby increase the compression performance by eliminating explicit coding of each insignificant coefficient.

The positions of the significant coefficients within the overall array of pixels can be encoded by a variety of methods, including coefficient maps, tree structures or run length coding. In one preferred embodiment, the numerous insignificant coefficients are encoded by run lengths as shown in block 36. In run length coding, the number of insignificant coefficients which occur consecutively between two significant coefficients is specified, thereby effectively specifying the position of the second significant coefficient relative to the position of the first significant coefficient.

According to the present invention, an entropy encoder 16 and, more preferably, code word generating means 26 generates a plurality of code words which are representative of the quantized significant coefficients. Accordingly, the plurality of code words effectively represent the quantized image data. Each code word includes at least a first portion (hereinafter termed a "prefix field") and an associated second portion (hereinafter termed a "suffix field"). Accordingly, the code word generating means preferably includes a prefix generating means 27 for generating the prefix field of each code word and a suffix generating means 28 for generating the associated suffix field of each code word. Since each code word is formed of two fields, namely, the prefix field and the suffix field, this method of coding will be termed "split field coding".

According to split field coding, the prefix field includes information representative of the associated suffix field, while the suffix field associated with the prefix field includes information representative of the respective significant coefficient, typically encoded according to a predetermined codebook. More specifically, the prefix field preferably includes information representative of the predetermined number of characters which form the associated suffix field. The prefix field may also include information representative of another predetermined characteristic of the associated suffix field, such as the contiguous or consecutive range of coefficient values which the associated suffix field of the code word may represent.

Typically, each suffix field is associated with a corresponding prefix field and is formed by a predetermined number of characters, such as a predetermined number of bits. Thus, the prefix field preferably includes information representative of the predetermined number of characters which form the associated suffix field.

It has been widely observed that a decorrelating properties of the wavelet transform result in a distribution of coefficient values which is typically sharply peaked at zero and which decays more or less monotonically away from the peak at zero as depicted in FIG. 5A. This type of distribution dictates that similar coefficient values typically have similar probabilities or frequencies of occurrence. As noted previously, the quantizer 14 maps all coefficients whose values fall within a particular interval to a particular discrete symbol. As known to those skilled in the art, the statistics of the quantized coefficients can be characterized using a "histogram" which is a discrete distribution consisting of individual bins representing the frequency or probability of occurrence of the quantized coefficient values. Each bin is associated with a particular quantization interval and has a frequency defined by a count of the number of occurrences of quantized coefficients whose values fall within the associated quantization interval. A stylized representation of a quantized coefficient histogram is depicted in FIG. 5B. Because the counts within the histogram are dependent upon the original coefficient distribution, the histogram also demonstrates that bins which represent coefficients having similar values will typically have similar counts or probabilities of occurrence.

As known to those skilled in the art, entropy coding achieves a reduction in the number of bits required to represent a data set by assigning shorter code words to symbols which occur frequently and longer code words to symbols which occur less frequently. Consequently, symbols with similar probabilities of occurrence should be presented by code words with similar lengths, and because quantized coefficients with similar values typically share similar probabilities of occurrence as described above, they should also be represented by code words having similar code word lengths.

According to one advantageous embodiment of the present invention, the prefix field includes information representative of the number of bits K which form the associated suffix field of the code word. Furthermore, the prefix field preferably includes information representative of a specific set of $2^K$ consecutive histogram bins of the quantized coefficient histogram which are, in turn, associated with a corresponding set of $2^K$ consecutive quantized coefficient values. The $2^K$ possible values for the associated K bit suffix field will each be associated by one-to-one correspondence with the $2^K$ consecutive bins which are designated by the associated prefix field. In aggregate, the prefix and suffix field of each code word shall together include information representative of a specific symbol, associated with a specific bin of the quantized coefficient histogram. Accordingly, the quantized coefficient histogram shall be partitioned into sets of consecutively occurring bins which shall be referred to as "superbins". Each superbin is, in turn, associated with a unique value of the prefix field.

FIG. 5B shows the partitioning of an exemplary quantized coefficient histogram into sets termed "superbins", i.e., the dotted lines indicate the bounds of the superbins. It will be apparent to those skilled in the art, however, that the histogram can be partitioned in other manners without departing from the spirit and scope of the present invention. Accordingly, the partitioning of the exemplary histogram of FIG. 5B into superbins is depicted and discussed for purposes of illustration and not limitation.

The central bin (shaded) of the exemplary histogram corresponds to the insignificant coefficients which are not directly encoded as quantized coefficients and are therefore not included in any superbin. On either side of the central bin, the histogram illustrates a superbin consisting of two bins. These superbins would preferably each be associated with a suffix field having a length of 1 bit which is sufficient to distinguish the 2 individual bins of the superbin. The histogram in FIG. 5B also shows superbins with widths of 4 and 8 bins which would preferably be associated with suffix fields having lengths of 2 and 3 bits respectively, so as to distinguish the individual bins within each of the superbins.

The prefix generating means 27 can generate the prefix fields in a variety of manners, such as unary coding. As known to those skilled in the art, one type of unary coding represents an unsigned integer J using J bits consisting of (J−1) zeros followed by a single one bit which terminates the code. In instances in which the largest value to be represented by a unary code, such as JMAX, is known, the integer JMAX may be represented by (JMAX−1) zeros with no terminating one required to differentiate JMAX from larger integers. In instances in which the values to be represented by the code words are signed quantities, the prefix field can also include an extra or leading bit which designates the sign of the quantized coefficient represented by the code word.

According to the present invention, each possible value for the prefix field can be associated with a respective suffix field having a predetermined number of characters. The suffix generating means 28 can generate the suffix fields in a variety of manners, but, in one preferred embodiment, the suffix fields are binary integers of length K. In this preferred embodiment, each possible combination of the K bit suffix field is associated with one of the $2^K$ bins which form the superbin designated by the associated prefix field. For example, the two and three bit integers shown over the superbins in the histogram of FIG. 5B represent the prefix field codes for the respective superbins. The most significant bit is a sign bit, while the remaining bits are a unary code which specifies the respective superbin. As described above, the associated suffix fields for the superbins of width 2, 4, and 8 bins consist of 1, 2, or 3 bits, respectively. Note that the code words associated with each superbin all share the same code word length. As previously noted, the bins for similar valued coefficients typically have similar counts or probabilities of occurrence, so that the proposed codes can result in efficient codes by assigning common code word lengths to coefficients with similar probabilities.

In summary, the prefix field preferably includes information representative of a predetermined characteristic of the associated suffix field, such as the predetermined number of characters which form the associated suffix field of the code word. Furthermore, the prefix field may also include information representative of another predetermined characteristic of the associated suffix field, such as the contiguous or consecutive range of coefficient values or bins which the associated suffix field of the code word may represent, wherein the contiguous or consecutive range corresponds to a superbin. In addition, the suffix fields include information representative of respective portions of the original data, such as specifically designating an individual bin within a superbin.

Consequently, if the prefix field of a code word is decoded correctly, that is, without the occurrence of bit error, the method and apparatus of the present invention can correctly determine the length of the associated suffix field and can also correctly determine the range of coefficient values to be represented by the associated suffix field. As a result, the associated suffix field will exhibit resilience to errors in two respects. First, one or more bit errors within the associated suffix field shall not result in a loss of code word synchronization but, instead, the effects of those bit errors shall be isolated to that single code word. Second, the misdecoded coefficient value resulting from one or more bit errors within the associated suffix field shall be constrained to that contiguous range of coefficient values represented by the prefix field which corresponds to the range of the associated superbin.

Accordingly, the method and apparatus of the present invention is suitable for use with unequal error protection means as known to those skilled in the art and as described, for example, in R. G. Gallager, "Information Theory and Reliable Communication", Wiley and Sons (1968). Specifically, the prefix fields of the encoded data are preferably channel encoded with an appropriately high level of error protection in order to provide a high probability that the prefix fields will be decoded correctly. Because the associated suffix fields are error resilient, however, the suffix fields may be channel encoded with a lower level of error protection or may not be channel encoded, thereby providing no error protection. This unique error protection shall result in a reduction of storage requirements or a reduction in transmission bandwidth because the use of a lower level of error protection or no error protection will reduce the introduction of redundant data into the data link or storage medium while still providing error resiliency.

As known to those skilled in the art, a variety of proposed codes can be separated into a prefix and suffix fields as described above. See, for example, E. R. Fiala and D. H. Greene, "Data Compression with Finite Windows," *Communications of the ACM*, Vol. 32, No. 4, pp. 490–505 (1989). However, the proposed codes have not previously been separated in order to provide error resiliency as provided by the method and apparatus of the present invention.

It will be apparent to those skilled in the art that split field coding can be applied to data sets which are not characterized by a well-behaved distribution. This application can be accomplished by initially sorting the data set to produce a re-ordered monotonic distribution. This approach will result in error resilience in the sense that a bit error in the suffix field will not result in a loss of code word synchronization. However, the resulting error in the decoded value will not be constrained to a particular range since the sorting of the data set will destroy the contiguity of the superbins associated with specific prefix field values.

The relative positions of the significant coefficients can also be encoded in a variety of manners, such as run length coding as described above. The resulting run length values can, in turn, also be entropy encoded using an approach such as Huffman coding or the split field coding method described above. Alternatively, the positions of the significant coefficients can be encoded by other methods known to those skilled in the art, such as tree structures or coefficient maps, without departing from the spirit and scope of the present invention.

Once the plurality of code words representative of the quantized coefficients and the encoded run lengths have been generated, the run length code words and the prefix fields of the quantized coefficient code words are preferably error protected at an appropriately high level of error protection, as shown in block 38. The run length code words are preferably afforded protection because a misdecoded run length value can potentially introduce catastrophic distortion into the reconstructed image. However, the suffix fields of the quantized coefficient code words are preferably error protected at a relatively lower level of error protection, if at all. As shown schematically in FIG. 1, the data encoder 16 can therefore include unequal error protection means 29 for providing appropriate levels of error protection to the encoded data as described above.

Regardless of the error protection means, error protection adds redundancy to the encoded data and increases the storage and transmission requirements. Accordingly, by providing a reduced level of error protection or no error protection to the suffix fields of the quantized coefficient code words, the storage and transmission requirements can be reduced by the method and apparatus of the present invention while limiting the effects of bit errors incident upon the suffix fields of the quantized coefficient code words.

Figure 6:
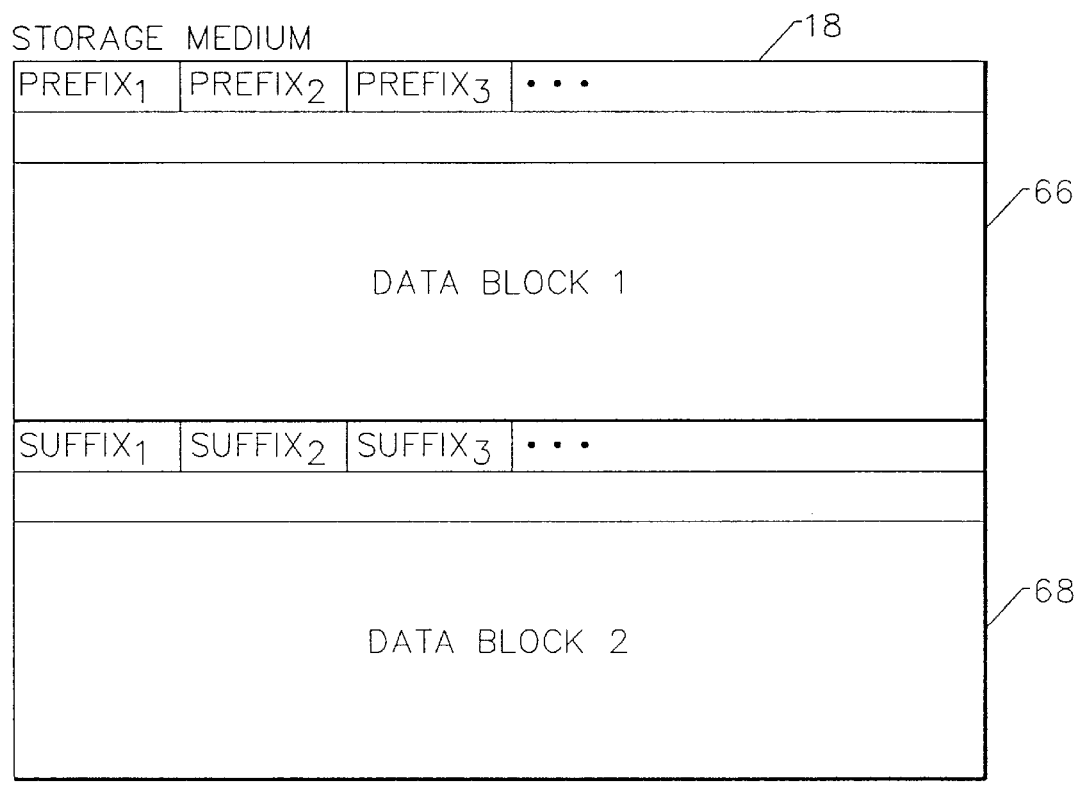
FIG. 6 illustrates a storage medium partitioned into first and second data blocks for storing the prefix and suffix fields, respectively, of the code words generated according to the method and apparatus of one embodiment of the present invention.

Following the data compression process described above, the encoded data can be efficiently stored. For example, the run length code words and the prefix fields of the quantized coefficient code words can be stored in a first data block 66 defined by a storage medium 18, such as a magnetic disk storage which is error protected as shown in FIG. 6. In addition, the respective suffix fields of the quantized coefficient code words can be stored in a second data block 68 defined by a storage medium which includes a reduced level of error protection or no error protection. Thus, the suffix fields can be more efficiently stored within the second data block.

Likewise, the compressed and encoded data can be efficiently transmitted, such as via first and second data links. In particular the error resilient method and apparatus of the present invention can include a transmitter 20 which transmits the respective run length code words and the prefix fields of the quantized coefficient code words via a first data link 22 which is error protected, and which transmits the respective suffix fields of the quantized coefficient code words via a second data link 24 which is not error protected or is error protected to a lesser degree than the first data link. Thus, the suffix fields can be more efficiently transmitted (with reduced or no redundancy) using the second data link.

Upon reception of the compressed data, the prefix fields of the quantized coefficient code words can be decoded (as shown in FIG. 7) and the lengths of the suffix fields can be determined based on the decoded prefix fields. If one or more bit errors are incident upon the suffix field of a quantized coefficient code word, the code word synchronization is not lost because the length of the suffix field is known. As a result, the resulting error in the decoded coefficient value will be constrained to the range of coefficient values for the superbin corresponding to the associated prefix field. Accordingly, the effects of the error on the reconstructed image will be limited and will not be catastrophic. Following the transmission of the encoded data and the possible detection and correction of any storage and transmission errors by means of channel decoding known to those skilled in the art, the compressed data, including both the quantized values for the significant coefficients and the relative positions of the significant coefficients, is decoded, dequantized, and inverse transformed, as known to those skilled in the art, so as to provide a reconstructed image based upon the original image as shown in FIG. 7.

The error resilient method and apparatus for compressing data, including the data transformer 12, the data quantizer 14, the data encoder 16 and the unequal error protection means 29, are preferably implemented by a combination of hardware and software. For example, the method and apparatus for compressing data can be implemented by a computer having one or more controllers which operate under the control of software to provide the data transformation, quantization and encoding processes described above.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. An error resilient method of encoding data comprising the steps of:

generating a plurality of code words representative of respective portions of the data, wherein each code word comprises a first portion and an associated second portion, and wherein said code word generating step comprises the steps of:

generating the first portion of each code word, wherein said first portion generating step comprises the step of including information within the first portion that is representative of a predetermined characteristic of the associated second portion; and generating the second portion of each code word, wherein said second portion generating step comprises the step of including information within the second portion that is representative of the respective portion of the data; and providing error protection to at least one of the first portions of the plurality of code words while maintaining any error protection provided to the respective second portion associated with the at least one first portion at a lower level than the error protection provided to the respective first portion.

2. An error resilient method of encoding data according to claim 1 wherein said step of generating a plurality of code words comprises the step of entropy coding the data to thereby reduce the size of the resulting code words.

3. An error resilient method of encoding data according to claim 1 wherein said step of generating the second portion of each code word comprises the step of generating second portions having predetermined numbers of characters, and wherein said step of generating the first portion of each code word comprises the step of generating first portions which include information representative of the predetermined number of characters which comprise the associated second portion.

4. An error resilient method of encoding data according to claim 3 further comprising the step of determining the probability with which respective ones of the plurality of code words are generated, wherein said step of generating second portions having predetermined numbers of characters comprises the step of generating a plurality of second portions having the same predetermined number of characters, and wherein the plurality of second portions which have the same predetermined number of characters comprise portions of respective code words which have corresponding probabilities of generation within a predetermined range of probabilities.

5. An error resilient method of encoding data according to claim 1 wherein said step of providing error protection comprises the steps of:

storing the at least one first portion of the plurality of code words in a first data block of a storage medium, wherein the first data block is error protected; and storing the respective second portion associated with the at least one first portion in a second data block of the storage medium, wherein any error protection provided by the second data block is at a lower level than the error protection provided by the first data block.

6. An error resilient method of encoding data according to claim 1 wherein said step of providing error protection comprises the steps of:

transmitting the at least one first portion of the plurality of code words via a first data link, wherein the first data link is error protected; and transmitting the respective second portion associated with the at least one first portion via a second data link, wherein any error protection provided by the second data link is at a lower level than the error protection provided by the first data link.

7. A data encoding apparatus comprising:

code word generating means for generating a plurality of code words representative of respective portions of the data, wherein each code word comprises a first portion and an associated second portion, and wherein said code word generating means comprises:

first generating means for generating the first portion of each code word, said first generating means comprising means for including information within the first portion that is representative of a predetermined characteristic of the associated second portion; and second generating means for generating the second portion of each code word, said second generating means comprising means for including information within the second portion that is representative of the respective portion of the data; and error protection means for providing error protection to at least one of the first portions of the plurality of code words while maintaining any error protection provided to the respective second portion associated with the at least one first portion at a lower level than the error protection provided to the respective first portion.

8. A data encoding apparatus according to claim 7 wherein said code word generating means comprises entropy coding means for entropy coding the data to thereby reduce the size of the resulting code words.

9. A data encoding apparatus according to claim 7 wherein said second generating means generates second portions having predetermined numbers of characters, and wherein said first generating means generates first portions which include information representative of the predetermined number of characters which comprise the associated second portion.

10. A data encoding apparatus according to claim 7 wherein said error protection means comprises a storage medium for storing the plurality of code words, said storage medium being partitioned into a first data block which is error protected and a second data block, wherein any error protection provided by the second data block is at a lower level than the error protection provided by the first data block, wherein the at least first portion of the plurality of code words is stored in the first data block of the storage medium, and wherein the respective second portion associated with the at least one first portion is stored in the second data block of the storage medium.

11. A data encoding apparatus according to claim 7 wherein said error protection means comprises:

first data link transmitting means for transmitting the at least one first portion of the plurality of code words via a first data link, wherein the first data link is error protected; and second data link transmitting means for transmitting the respective second portion associated with the at least one first portion via a second data link, wherein any error protection provided by said second data link is at a lower level than the error protection provided by said first data link.

12. An error resilient method of compressing data comprising the steps of:

transforming the data based upon a predetermined transformation function;

quantizing the transformed data such that the quantized data has fewer unique coefficients than the transformed data; and encoding the quantized data, said encoding step comprising the steps of:

generating a plurality of code words, representative of respective portions of the data, which have respective first and second portions, wherein said code word generating step comprises the steps of including information within the first portion that is representative of a predetermined characteristic of the associated second portion, and including information within the second portion that is representative of a respective portion of the data; and providing error protection to at least one of the first portions of the plurality of code words while maintaining any error protection provided to the respective second portion associated with the at least one first portion at a lower level than the error protection provided to the respective first portion.

13. An error resilient method of compressing data according to claim 12 wherein said step of encoding the quantized data comprises the step of entropy coding the quantized data to thereby reduce the size of the resulting code words.

14. An error resilient method of compressing data according to claim 12 wherein said step of generating a plurality of code words comprises the steps of:

generating second portions having predetermined numbers of characters; and generating first portions which include information representative of the predetermined number of characters which comprise the associated second portion.

15. An error resilient method of compressing data according to claim 14 further comprising the step of determining the probability of occurrence of respective ones of the quantized data values, wherein said step of generating second portions having predetermined numbers of characters comprises the step of generating a plurality of second portions having the same predetermined number of characters, and wherein the plurality of second portions which have the same predetermined number of characters comprise portions of respective code words which represent quantized data values having corresponding probabilities of generation within a predetermined range of probabilities.

16. An error resilient method of compressing data according to claim 12 wherein said step of providing error protection comprises the steps of:

storing the at least one first portion of the plurality of code words in a first data block of a storage medium, wherein the first data block is error protected; and storing the respective second portion associated with the at least one first portion in a second data block of the storage medium, wherein any error protection provided by the second data block is at a lower level than the error protection provided by the first data block.

17. An error resilient method of compressing data according to claim 12 wherein said step of providing error protection comprises the steps of:

transmitting the at least one first portion of the plurality of code words via a first data link, wherein the first data link is error protected; and transmitting the respective second portion associated with the at least one first portion via a second data link, wherein any error protection provided by the second data link is at a lower level than the error protection provided by the first data link.

18. An error resilient method of compressing data according to claim 12 wherein said transforming step comprises the step of transforming the data based upon a wavelet transform.

19. An error resilient method of compressing data according to claim 18 wherein said transforming step comprises the step of transforming the data based upon a biorthogonal wavelet transform.

20. An error resilient method of compressing data according to claim 12 wherein the transformed data includes a plurality of transformed coefficients, and wherein said quantizing step comprises the step of detecting transformed coefficients below a predetermined clipping threshold.

21. An error resilient method of compressing data according to claim 20 further comprising the step of establishing a clipping threshold such that the ratio of the number of detected coefficients to the number of transformed coefficients which are not detected is at least as great as a predetermined clipping ratio.

22. An error resilient data compression apparatus comprising:
    a data transformer for transforming the data based upon a predetermined transformation function;
    a data quantizer for quantizing the transformed data such that the quantized data has fewer unique coefficients than the transformed data; and
    a data encoder for encoding the quantized data, said data encoder comprising:
        code word generating means for generating a plurality of code words, representative of respective portions of the data, which have respective first and second portions, wherein said code word generating means comprises means for including information within the first portion that is representative of a predetermined characteristic of the associated second portion, and means for including information within the second portion that is representative of a respective portion of the data; and
        error protection means for providing error protection to at least one of the first portions of the plurality of code words while maintaining any error protection provided to the respective second portion associated with the at least one first portion at a lower level than the error protection provided to the respective first portion.

23. An error resilient data compression apparatus according to claim 22 wherein said data encoder comprises entropy coding means for entropy coding the quantized data to thereby reduce the size of the resulting code words.

24. An error resilient data compression apparatus according to claim 22 wherein said code word generating means comprises:
    second generating means for generating second portions having predetermined numbers of characters; and
    first generating means for generating first portions which include information representative of the predetermined number of characters which comprise the associated second portion.

25. An error resilient data compression apparatus according to claim 22 wherein said error protection means comprises a storage medium for storing the plurality of code words, said storage medium being partitioned into a first error protected data block and a second data block, wherein any error protection provided by said second data block is at a lower level than the error protection provided by said first data block, wherein the at least first portion of the plurality of code words is stored in the first data block of the storage medium, and wherein the respective second portion associated with the at least one first portion is stored in the second data block of the storage medium.

26. An error resilient data compression apparatus according to claim 22 wherein said error protection means comprises:
    first data link transmitting means for transmitting the at least one first portion of the plurality of code words via a first data link, wherein the first data link is error protected; and
    second data link transmitting means for transmitting the respective second portion associated with the at least one first portion via a second data link, wherein any error protection provided by the second data link is at a lower level than the error protection provided by the first data link.

27. An error resilient data compression apparatus according to claim 22 wherein said data transformer comprises a wavelet transformer for transforming the data based upon the wavelet transformer.

28. A computer readable memory for storing error resilient encoded data, the computer readable memory comprising:
    a storage medium for storing the error resilient encoded data, said storage medium being partitioned into a first error protected data block and a second data block, wherein any error protection provided by said second data block is at a lower level than the error protection provided by said first data block; and
    a plurality of code words, representative of respective portions of the original data, which have respective first and second portions, wherein the first portion of each code word includes information representative of a predetermined characteristic of the associated second portion, and wherein the associated second portion of each code word includes information representative of a respective portion of the original data,
    wherein at least one of the first portions of the plurality of code words is stored in the first data block of said storage medium such that the at least one first portion is error protected, and wherein the respective second portion associated with the at least one first portion is stored in the second data block of said storage medium such that any error protection provided to the respective second portion associated with the at least one first portion is at a lower level than the error protection provided to the respective first portion.

29. A computer readable memory for storing error resilient encoded data according to claim 21 wherein the second portion of each code word has a predetermined number of characters, and wherein the first portion of each code word includes information representative of the predetermined number of characters which comprise the associated second portion.

30. A computer readable memory for storing error resilient encoded data according to claim 29 wherein each of the plurality of code words occurs according to a predetermined probability, wherein a plurality of second portions of code words have the same predetermined number of characters, and wherein the plurality of second portions which have the same predetermined number of characters comprise portions of respective code words which have corresponding probabilities of occurrence within a predetermined range of probabilities.

* * * * *